Sept. 10, 1940.　　G. A. WAHLMARK　　2,214,390
FLUID PRESSURE GENERATING AND CONTROL MEANS
Filed May 7, 1937　　5 Sheets-Sheet 1
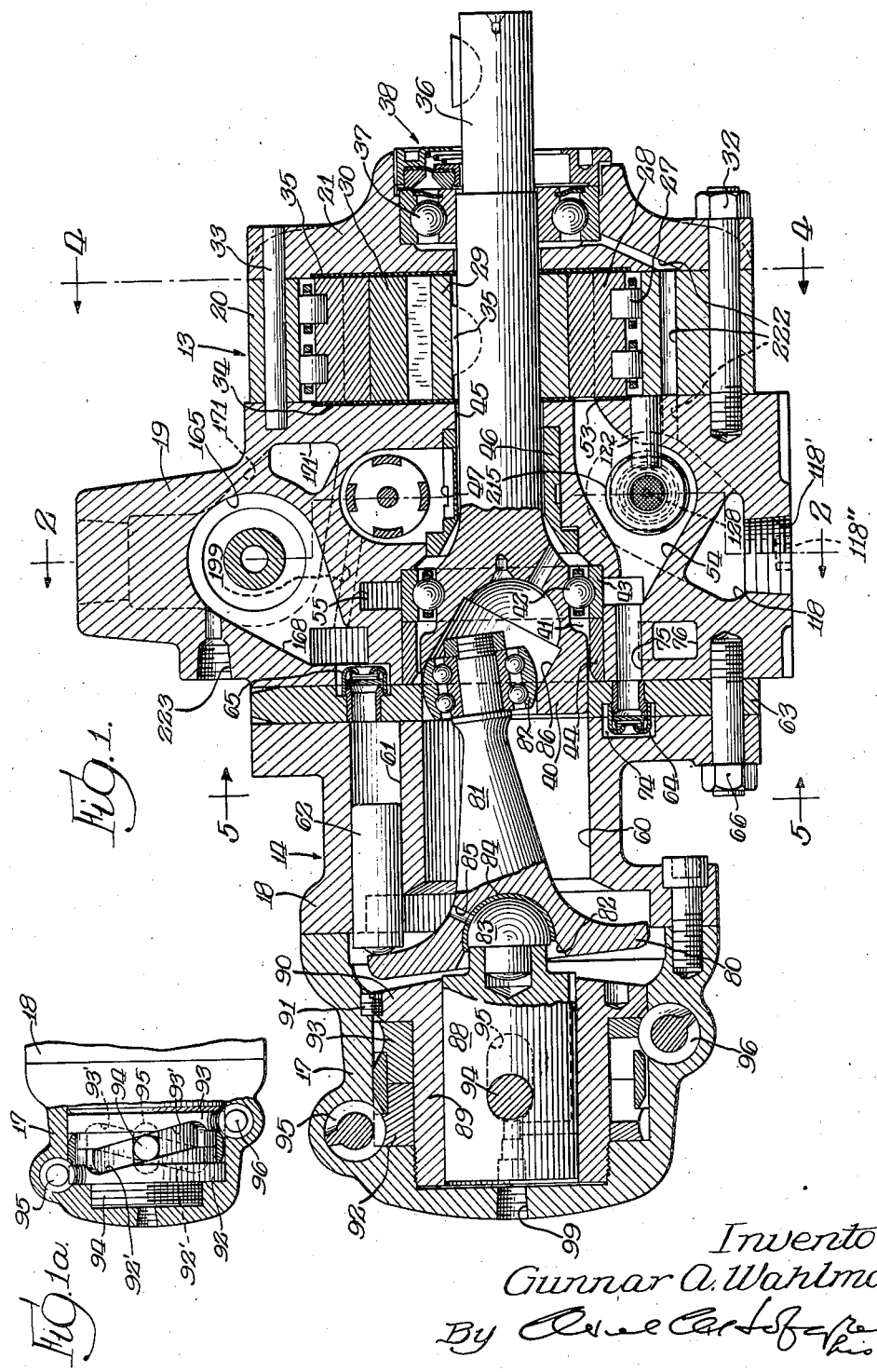
Inventor:—
Gunnar A. Wahlmark,
By his Atty.

Sept. 10, 1940.   G. A. WAHLMARK   2,214,390
FLUID PRESSURE GENERATING AND CONTROL MEANS
Filed May 7, 1937   5 Sheets-Sheet 2
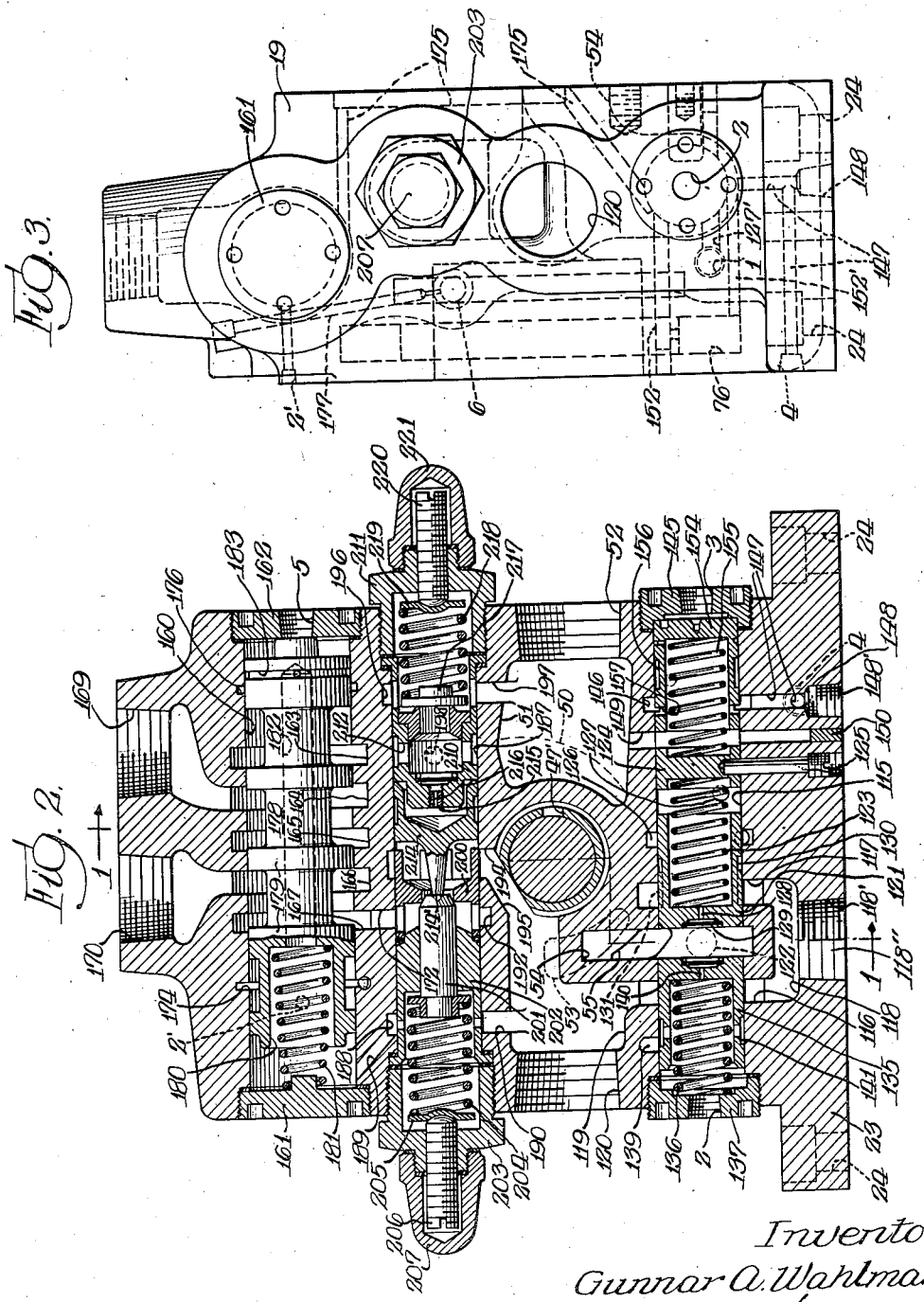
Inventor:
Gunnar A. Wahlmark,
By his Atty.

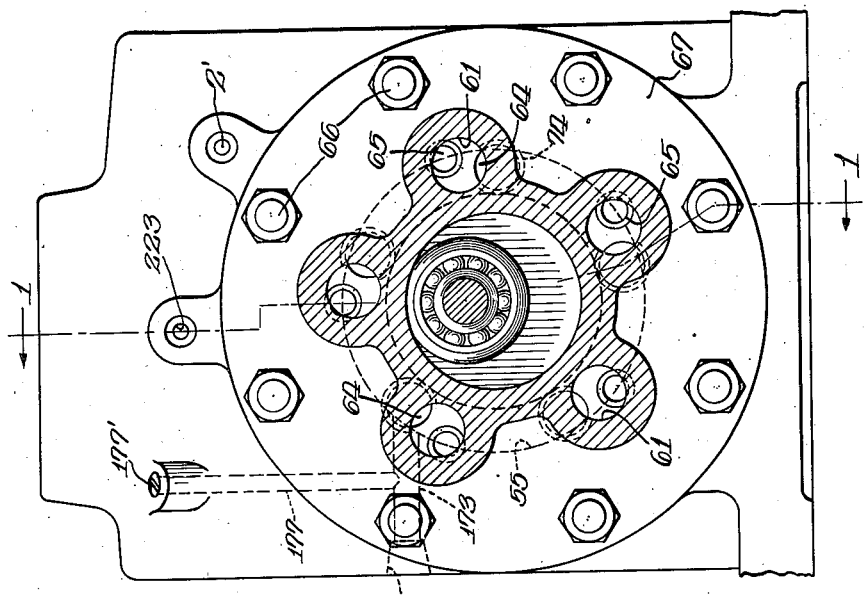

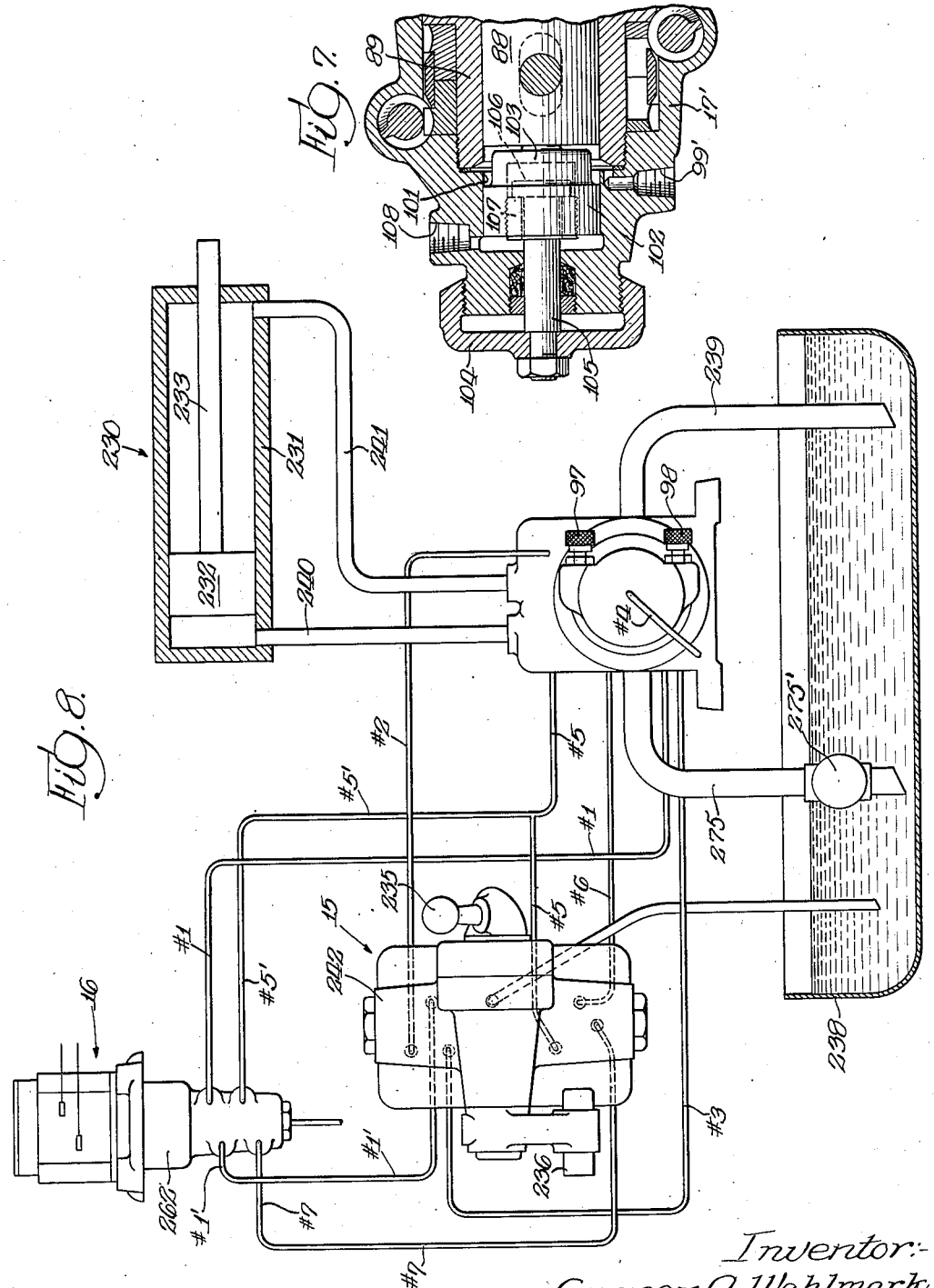

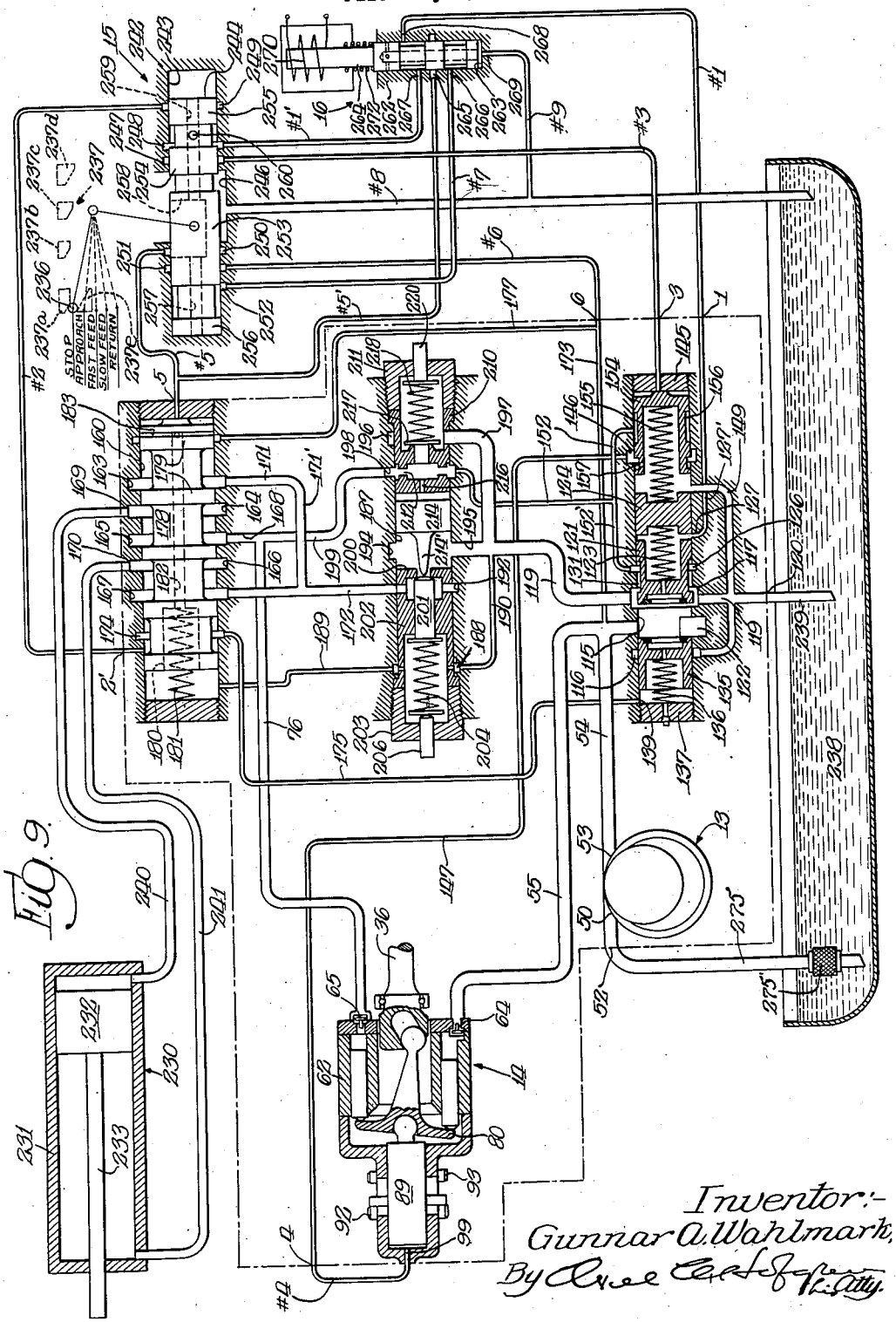

Patented Sept. 10, 1940

2,214,390

UNITED STATES PATENT OFFICE 2,214,390

FLUID PRESSURE GENERATING AND CONTROL MEANS

Gunnar A. Wahlmark, Rockford, Ill.

Application May 7, 1937, Serial No. 141,327

40 Claims. (Cl. 103—11)

This application is a continuation-in-part of my abandoned application Serial No. 60,646, filed January 24, 1936.

The invention relates generally to fluid pressure generating and control means and particularly to such generating and control means especially adapted for use with machine tools, and has as a general object to provide new and improved means of that character and particularly a combined pump having a constant displacement stage and a variable displacement stage of novel and improved construction.

A more particular object is to provide a fluid pressure generating means having a constant displacement, self-priming stage supplying fluid at different pressure conditions to a variable displacement stage of novel and improved construction which under a certain pressure condition permits operation thereof without pumping fluid, under another condition, during continued operation, permits the entire discharge from the constant displacement stage to flow therethrough, and, under still another condition, meters and raises the pressure of a portion of the fluid discharged by the constant displacement stage.

Another object is to provide a pump of novel and improved construction having a constant displacement, self-priming stage composed of rotary elements, and a variable displacement, non-self-priming stage composed of reciprocatory elements in which the intake stroke is imparted to the reciprocatory elements by the fluid discharged from the constant displacement stage.

Yet another object is to provide a variable displacement piston pump in which the head clearance in the cylinders is reduced with an adjustment of the pump reducing the displacement thereof.

Still another object is to provide a variable displacement piston pump having a wobble plate for actuating the pistons swiveled on an axially movable member, and a shaft for driving the wobble plate having a recess oblique to its axis constituting a crank arm in which is received the end of an axial arm on the wobble plate, whereby the throw of the plate and the movement of the pistons are changed upon adjustment of the plate axially relative to the shaft.

Further objects and advantages will become readily apparent from the following detailed description taken in connection with the accompanying drawings, wherein:

Fig. 1 is a longitudinal central section through a preferred form of the unitary structure of the invention taken approximately along the line 1—1 of Figs. 2, 4 and 5.

Fig. 1a is an elevational view of the displacement varying means of Fig. 1, somewhat reduced, partially broken away to reveal the displacement adjusting cam rings.

Fig. 2 is a transverse section taken approximately along the line 2—2 of Fig. 1.

Fig. 3 is an elevational view, taken from the left in Fig. 2, of that section of the structure housing the governing valve mechanism.

Fig. 4 is a transverse section taken approximately along the line 4—4 of Fig. 1.

Fig. 5 is a transverse section taken approximately along the line 5—5 of Fig. 1.

Fig. 6 is an enlarged detail view of a check valve.

Fig. 7 is a modified form of means for varying the displacement of the feed pump.

Fig. 8 is a view showing the unitary hydraulic mechanism connected in circuit with an actuator for a machine tool and with remote control valve mechanism.

Fig. 9 is the hydraulic mechanism and circuit of Fig. 8 illustrated diagrammatically in order better to show the porting, passages, etc. The valves are shown disproportionately large better to illustrate grooves and ports.

While the invention is susceptible of various modifications and alternative constructions, it is shown in the drawings and will hereafter be described in a preferred embodiment and a modification of a portion thereof, but it is not intended that the invention is to be limited thereby to the specific construction disclosed, but it is intended to cover all modifications and alternative constructions falling within the spirit and scope of the invention as defined by the appended claims.

As shown in the drawings for purposes of disclosure, the pressure generating and control means comprises generally pumping mechanism for creating fluid pressure, governing mechanism directly associated with the pumping mechanism for controlling the direction and volume of fluid discharge thereby and adapted to be housed in a unitary structure with the pumping mechanism, and control means for controlling the governing mechanism from a remote point. The pumping mechanism herein is composed of a large output constant displacement pump generally designated 13, commonly known as a "traverse" pump, and a low output variable displacement pump generally designated 14, commonly known as a "feed" pump, with the feed pump of unique construction and associated with the traverse pump in a unique manner so as to function or act in a variety of ways upon different quantities of fluid supplied by the traverse pump though both pumps continue to operate. More particularly, under one condition the pump 14 functions to discharge no fluid whatsoever, while under another condition, the pump functions to meter and to boost the pressure of a portion of the fluid supplied by the traverse pump, and, while under yet a different condition, the pump 14 functions to pass all of the fluid supplied by the traverse pump without acting thereon. The governing mechanism herein is composed of volume controlling valve means which includes valves governing the conditions determining the manner in which the pumps function and a valve controlling the displacement of the variable delivery pump 14; direction controlling valve means consisting of a single valve for determining the direction of discharge; and pressure limiting valve means consisting of two valves, one in the nature of a high pressure relief valve and the other in the nature of a low pressure limit valve or circuit locking valve. A pilot valve 15 and a solenoid valve 16 compose the remote control means. The pumping and the governing mechanisms are designed and arranged to be incorporated in a unitary structure having an elongated casing composed of a plurality of sections 17, 18, 19, 20, and 21. The intermediate section 19, to which the remaining sections are attached to be supported thereby, is provided with a base 23 (see Figs. 3 and 4) for mounting the structure. Apertures 24 are formed in the base through which bolts may project to secure the structure in position.

Herein the constant displacement pump 13 (see Figs. 1 and 4) has rotary pumping elements of the general character disclosed and claimed in my copending applications Serial No. 675,218, filed June 10, 1933, now Patent No. 2,132,813, date October 11, 1938, and Serial No. 14,017, filed April 1, 1935, now Patent No. 2,146,037, dated February 7, 1939, and is housed in a bore 26 eccentrically positioned in the section 20 disposed on the right side of the section 19, as viewed in Fig. 1, and in abutting, fluid-tight relation thereto. Rotably mounted within the bore 26 on roller bearings 27 is a toothed rotor 28 constituting one of the pumping elements. Meshing with the rotor 28 and eccentrically mounted therein is a toothed roller 29 constituting the other of the pumping elements. Interposed in the space formed by the eccentric mounting of the rotor and the roller is a crescent shaped element 30 secured in position by bolts 31 extending into the intermediate section 19. The left end face of the elements, as viewed in Fig. 1, is sealed by the intermediate section 19, while the right end face is sealed to complete the pump housing by the section 21 serving as a cover or cap. Bolts 32 extend through the section 21 as well as the section 20 and into the intermediate section 19 so as to secure both sections 20 and 21 thereto. A pin 33, which also extends through both sections 20 and 21 and into the section 19, assures the proper location of the section 20. Preferably, bronze plates 34 and 35 are interposed between the rotary pump elements and the sections 19 and 21 respectively to provide a suitable bearing surface.

As here shown, the roller 29 is the driving element and to that end is secured as by a key 35 to a drive shaft 36 extending longitudinally of the casing and projecting from the right end thereof. At its projecting end, the shaft 36 is journaled in a ball bearing 37 housed in a recess formed in the cover section 21. The bearing 37 is retained in the recess by a mechanical rotary seal, generally designated 38, threaded into the recess to prevent leakage of liquid outwardly along the shaft. At its inner end, the shaft terminates in an enlarged head 40 disposed in the cylindrical portion of a recess 41 formed in the intermediate section 19 where it is journaled in a ball bearing 42. The inner race of the bearing is formed directly on the head 40 while the outer race is formed by a ring 43 retained in position by an annular spacer 44. The recess 41 in the intermediate section 19 adjacent the section 20 is reduced to an aperture 45 through which the shaft 36 projects, and intermediate the aperture 45 and the ring 43 the shaft is surrounded by an annular sleeve 46 formed with an annular groove 47 having an aperture 47' registering therewith.

Upon rotation, the rotor 28 and the roller 29 operate in well known manner to draw liquid into the recesses between the teeth of the elements through a suction port 50 (see Figs. 2 and 4) communicating with a passage 51 formed in the intermediate section 19 and terminating in an intake port 52. Liquid is discharged by the elements through an exhaust port 53 opening into a passage 54 formed in the intermediate section 19 and communicating with an annular passage 55, one wall of which is formed by the annular ring 43 providing the outer race for the ball bearing 42. This annular passage constitutes the intake of the variable displacement pump 16. Though actually located forwardly of the plane of Fig. 2, ports 50 and 53 are shown in dotted outline in that figure as an aid in visualizing their location.

The variable displacement pump 14 herein is composed of reciprocatory pumping elements and is housed in the section 18 which has an axial bore 60 and a plurality of annularly arranged longitudinally extending cylinders 61, here five in number (see Figs. 1 and 5), open at both ends. Reciprocable in each of the cylinders 61 is an elongated piston 62, in all positions projecting from the end of the cylinder remote from the head 40 of shaft 36. The section 18 is disposed on the left side of the intermediate section 19, as viewed in Fig. 1, but is spaced therefrom by a plate 63 carrying an intake check valve 64 and an exhaust check valve 65 for each of the cylinders. To secure the section, bolts 66 extend through an annular flange 67 on the section 18 and through apertures in the plate 63 and thread into section 19, thereby securing both the section 16 and the plate 63.

One such intake or exhaust valve is shown in Fig. 6 and comprises a bushing 69 and a disk 70 urged to seat over the end of the bushing by a compression spring 71 which, at its other end, abuts an inturned flange of a retaining sleeve 72 secured to the bushing. The inturned flange of the sleeve 72 has a reversely bent portion 72' limiting the opening movement of the valve disk and the sleeve proper has a plurality of apertures 73 through which the liquid escapes when the valve disk is unseated. As positioned in Fig. 6, the valve serves as an exhaust valve and is disposed to open and permit flow of liquid therethrough out of the cylinder but to seat and prevent the return flow of liquid into the cylinder. When reversed (see Fig. 1), the valve serves as an intake valve and functions to permit flow into the cylinder but prevents return flow out of the cylinder. As best seen in Fig. 5, the valves are offset from the cylinders 61 with the intake valves offset the most and each communicating with its cylinder through a groove 74 formed in the section 18. Each of the intake valves is connected with the annular intake passage 55 by a duct 75 formed in the intermediate section 19. The exhaust valves 65 all discharge into an irregular annular discharge passage 76 (see Fig. 1) formed in the section 19. By mounting the inlet valves on one side of the plate 63 and the outlet valves on the other side, all of the valves are readily removed and the valve seats ground in two settings.

Means is provided in the construction of the variable displacement pump 14 enabling the pump, while continuing to operate, to act variously under different conditions upon varying quantities of the liquid supplied by the constant displacement pump 13. To that end, the variable pump is made non-self-priming by imparting to the pistons 62 a positive forward or exhaust stroke only and relying upon the pressure of the liquid discharged by the constant displacement pump 13 to impart a return or intake stroke to the pistons. With this construction, the variable displacement pump has three modes of operation depending upon the pressure of the fluid in the passages 54 and 55. When the pressure is low, so as to be incapable of opening the intake check valves 64 and of imparting a return stroke to the pistons 62, the pistons remain in stroke to the head end of the cylinders and continued operation of the means imparting a forward stroke to the pistons has no effect, with the result that no liquid is passed into or out of the variable displacement pump. When, however, the pressure in the passages 54 and 55 is at a substantially higher value sufficient to open the intake check valves 64 and impart a return stroke to the pistons 62, but not sufficiently high to open the exhaust check valves 65 against the pressure externally thereof, the variable displacement pump is operative and functions to meter the quantity of fluid passing therethrough as well as to boost the pressure thereof. If the pressure in the passages 54 and 55 is raised to a very high value, sufficient both to open the discharge check valves 65 as well as to impart a return stroke to the pistons 62, the variable displacement pump, though the pistons thereof continue to reciprocate, serves merely as a passage for the fluid passing therethrough without being metered thereby. During the first mode of operation, when no fluid is admitted to the variable displacement pump, and during the second mode of operation if the displacement of the variable pump is adjusted for a quantity less than that of the constant displacement pump, the excess fluid in the passages 54 and 55 is discharged through a dumping valve, as will be more fully described hereinafter.

The means for imparting a positive forward or exhaust stroke only to the pistons 62 is driven from the shaft 36 and herein takes the form of a wobble plate 80 extending radially to engage the projecting ends of the pistons 62 and having an arm 81 extending longitudinally of the bore 60 into engagement with the shaft 36. The pistons 62 merely abut but do not have a fixed connection with the plate 80 and are maintained in contact with and caused to follow the plate only by the pressure of the liquid discharged by the constant displacement pump. At its base, the wobble plate 80 is formed with a socket 82 within which is received a ball 83 to provide a swivel mounting of the plate. Preferably the socket 82 has a bronze liner 84 and formed in the plate 80 is an oil duct 85 registering with an aperture in the lining to permit of lubrication of the ball and socket joint.

In order to impart a wobble movement to the plate 80 by rotation of the shaft 36, the enlarged end 40 of the shaft is formed with a recess 86 opening toward the wobble plate and disposed with its axis oblique to the axis of the shaft 36 so as to constitute, in effect, a crank arm. Carried on the end of the arm 81 is a ball bearing mounted roller 87 receivable within the recess 86 in the end of the shaft. It will be apparent that depending upon the axial position of the roller 87 with respect to the recess 86, a greater or lesser throw will be imparted to the wobble plate 80. If it is received the entire distance into the recess 86, the axis of the roller 87 and the axis of the shaft 36 are concentric and thus rotation of the shaft imparts no movement to the wobble plate 80 whatsoever. With a separation of the wobble plate and the shaft, the axis of the roller 87 becomes progressively more eccentric with respect to the axis of the shaft 36 and thus the throw of the wobble plate also becomes progressively larger. Thus the recess 86, with the roller 87, constitutes a variable crank arm which is adjusted by relative axial movement of the wobble plate and drive shaft to vary the throw of the plate and consequently the stroke of the pistons 62.

Means is provided for adjusting the wobble plate 80 and the shaft 36 axially relative to one another and herein such adjustment is effected by axial movement of the wobble plate 80. To that end, the ball 83 upon which the wobble plate is mounted is formed on the end of a piston 88 reciprocable in the longitudinal bore of a cylinder 89 threaded at one end into the end wall of the end section 17 but spaced from the side walls thereof. At its inner end, the cylinder 89 has a radial flange 90 and is locked in position by a plug 91 threaded partly into the section 17 and partly into the flange 90. Rotatably mounted on the cylinder 89 in the space between the cylinder and the section 17 are two rings 92 and 93 retained by the end wall of the section 17 and the flange 90. The rings are formed (see Fig. 1a) with diametrically opposite sets of parallel and complementary cam surfaces 92' and 93' with each set oblique to the axis of the cylinder but sloping in opposite directions, which cooperate with a rod 94 fixed in the piston 88 to determine the axial positions thereof. The rod 94 projects through longitudinal slots 95 in the cylinder 88 and terminates with its ends between the cam surfaces formed on the rings 92 and 93. Each of the rings 92 and 93 is formed on its outer periphery with worm teeth meshing with worms 95 and 96 respectively. The worms 95 and 96 may be actuated from externally of the section 17 by rotation of knurled knobs 97 and 98 (see Fig. 8). The wobble plate 80 may thus be adjusted manually by rotation of the rings 92 and 93 which may be so adjusted that they secure the piston 88 in a single fixed position or may be so positioned that they merely define the limits of movement of the piston 88.

With the rings 92 and 93 positioned so as to define the limits of movement of the piston 88, the piston may also be shifted automatically to vary the displacement of the pump. To that end, a port 99 is formed in the end wall of the section 17 and opens to the bore in the cylinder 89. The port is threaded for the reception of a conduit adapted to be connected to a source of fluid pressure. When the displacement of the pump is to be varied automatically by the application of fluid pressure to the piston 88, the rings 92 and 93 are first adjusted to preselect the two displacements desired. Ring 92 is rotated until the desired large displacement of the pump 14 is obtained when the cylinder 88 is shifted outwardly to the extent permitted by the ring 92 and ring 93 is adjusted to give the desired small displacement of the pump 14 when the cylinder 88 is shifted inwardly to the limit permitted by the ring 93. Normally, the reaction of the pistons 62 retains the wobble plate 80 seated on the ball 83 and the same reaction urges the cylinder 88 outwardly to the limit permitted by the ring 92. By supplying fluid to the cylinder 89 at a pressure sufficient to overcome the reaction of the pistons 62, the piston 88 may be moved inwardly to an extent permitted by the ring 93 and thereby decrease the displacement of the pump. It will be seen that with this construction, the variable pump 14 may be automatically adjusted to either of two displacements which may first be determined and preselected by manual adjustment.

Axial shifting of the wobble plate 80 relative to the shaft 36 to effect a change in the output of the variable displacement stage is highly desirable and results in an important feature of the invention. It is believed apparent that with a shift of the wobble plate not only is the length of the stroke of piston 62 changed, but also the mean positions of the pistons is changed, i. e., the midpoint between the limits of reciprocation of the pistons is shifted longitudinally of the cylinders. Thus, with an outward movement of the plate 80 to increase the stroke, the pistons follow the plate and their mean position is moved away from the head end of the cylinders. With an inward movement of the plate to decrease the stroke, the mean position of the pistons is moved toward the head end of the cylinders and reduces the head clearance therein. As a result, the pump is very accurate in the discharge of a small quantity of liquid because the column of liquid in each cylinder which is moved with each stroke is reduced to a minimum, thus minimizing the error caused by compression of the liquid, inertia of the column of liquid, entrained air bubbles, and heating due to the repeated surging back and forth of the column of liquid.

In Fig. 7, there is shown a slight modification of the displacement varying means whereby any one of three displacements, which have been preselected by manual adjustment, may be obtained automatically. In the modified construction, the means for obtaining the large displacement and the small displacement are the same as that disclosed in Fig. 1 with the exception that a port 99', through which fluid is supplied to the bore in the cylinder 89, opens through a side wall of the section 17' instead of through the end wall. The section 17', however, is extended and in the extension is formed with a bore 101 in which is reciprocable a hollow piston 102 having a portion 103 of reduced diameter permitting it to be received within the bore in the cylinder 89 so that it may abut the outer end of the piston 88. Threaded onto the end of the section 17' is a cap 104 which has secured therein an axially extending rod 105 with an enlarged head 106 on its inner end which is received within the piston 102. The piston 102 is retained on the rod 105 with a lost motion by means of an annular ring 107 which is threaded into the piston after the head 106 has been inserted and limits the inward movement of the piston.

Communicating with the bore 101 at the end opposite the cylinder 89 is a port 108 threaded for the reception of a conduit adapted to be connected to a source of pressure fluid. When fluid is supplied to the bore 101, the piston 102 is urged inwardly to the extent permitted by the rod 105 and in such movement abuts the piston 88 and imparts a corresponding movement thereto. By rotation of the cap 104, this position of the piston 88 may be manually preselected and may be a position intermediate that determined by the rings 92 and 93. Thus a third rate of displacement of the variable displacement pump 14 may be obtained automatically. The piston 88 may, of course, move inwardly under the influence of fluid pressure supplied through the port 99' independently of the piston 102, and the rod 105 is so designed that there is always a permissible outward movement of the piston 102 sufficient to permit the piston 88 to move outwardly to the limit defined by the ring 92.

As previously stated, the functioning of the pumping mechanism and the flow of the hydraulic fluid therethrough are controlled by governing mechanism composed of a plurality of valves. It is a feature of the invention that the pumping mechanism and the governing mechanism are so arranged that they may be incorporated in a single unitary structure. Such incorporation in a unitary structure enables the formation of the high pressure fluid passages and other passages as ducts within the unitary structure, and necessitates the use of external and exposed conduits only for low pressure control purposes, thereby reducing the amount of conduit required and the possibility of leakage and rupture of a portion of the hydraulic circuit. Moreover, by such incorporation into a single structure, the employment of the pumping and governing mechanism in a hydraulic circuit is greatly facilitated, requiring only the making of connections to the hydraulic motor, which is to be actuated by the circuit, and to the remote control valve means. The making of such connections is facilitated and expedited by the provision of a minimum number of external ports communicating with the valves and arranged to cause certain standardized operation of the valves when connected to pressure conduits.

While the unitary pumping mechanism and governing mechanism may be employed for a variety of uses, it is particularly designed with a view to use and is here shown in the hydraulic circuit of a machine tool. Accordingly, the governing mechanism includes valve means for controlling the quantity of fluid supplied, valve means for controlling the direction of the fluid supplied, and pressure limiting valve means. All of the valves composing the governing mechanism are housed in the intermediate section 19 so as to be convenient to both the constant displacement pump 13 and the variable delivery pump 14 and permit the employment of short ducts interconnecting the valves and the pumps.

To house the valve means controlling the quantity of fluid discharged by the unitary structure, the section 19 is formed with a transverse bore 115 (see Figs. 1-3 and 9) disposed below the shaft 36, the intake port 52 and passage 51 and intersecting the passage 54 which, as previously stated, communicates with the discharge port 53 of the constant displacement pump 13. Immediately adjacent and on opposite sides of the passage 54, the section 19 is formed with an annular groove 116 and an annular groove 117, both opening to the bore 115. The grooves 116 and 117 are connected by a passage 118, and the groove 116 opens into a large passage 119 communicating with a threaded return port 120 disposed substantially opposite the intake port 52. Opening through the bottom of the section 19 into the passage 118 is a port 118' normally closed by a plug 118".

Flow of fluid from the passage 54 to the groove 117 is controlled by a valve 121 in the form of a hollow piston, shiftable in the bore 115, which functions as a start and stop valve, as will later become more apparent. The valve 121 has two positions, namely, a closed position shown in Fig. 2 in which it projects into the opening between the passage 54 and the groove 117 to prevent flow therethrough, which position is determined by abutment with a plug 122, and an open position shifted to the right in Fig. 2 in which flow is permitted from the passage 54 to the groove 117. The valve is normally urged to its closed position by means of a light compression spring 123 which is disposed within the valve 121 with one end abutting the closed end of the valve and the other end abutting a plug 124 disposed in the bore 115. The plug 124 has a fluid-tight fit in the bore and is further retained in position by means of a pin 125 which projects through the section 19 and into the plug. Intermediate the groove 117 and the plug 124, the section 19 is formed with a second smaller annular groove 126 also opening to the bore, and immediately adjacent the plug 124 a port 127 opens into the bore. By means of a passage 127' (see Figs. 3, 4 and 9), port 127 is connected to a first external control fluid port 1 threaded for the reception of a conduit.

The valve 121 is formed at is closed end with a very small opening 128 to permit the bleeding of fluid from the passage 54 into the bore 115. Preferably, the end of the valve carries a screen 129 to prevent the entry of foreign material which might clog the small bleed opening 128. Intermediate its ends, the valve is formed with an annular groove 130 and longitudinal grooves 131 (see Fig. 9) opening into the annular groove 130 and extending toward the closed end of the valve 121 but terminating short thereof. The exact position of the groove 130 is such that it registers with the groove 126 when the valve is open but is out of registry therewith when the valve is closed.

Communication between the passage 54 and the groove 116 likewise is controlled by a valve 135, in the form of a hollow piston similar to the valve 121, which functions as a rate change or charging valve. This valve also has two positions, namely, a closed position in which it projects into the opening between the passage 54 and the groove 116 to prevent flow of fluid therethrough, which position is determined by abutment with the plug 122, and an open position shifted to the left in Fig. 2 in which flow is permitted from the passage 54 to the groove 116. The valve is urged to its closed position by a heavy compression spring 136 substantially stronger than the spring 123, having one end abutting the closed or head end of the valve 135, and the other end abutting a cap 137 threaded into the section 19 and closing the end of the bore 115. The cap 137 is provided with a second external control fluid port 2 threaded for the reception of a conduit, and opening into the bore 115 intermediate the groove 116 and the end of the bore is a port 139.

Like the valve 121, the valve 135 is formed at its closed end with an opening 140 and a screen disposed over the opening to permit bleeding of fluid from the passage 54 to the interior of the valve 135. Intermediate its ends, the valve is formed with an annular groove 141 having apertures communicating with the interior of the valve 135. The exact position of the groove 141 is such that it is always in communication with the port 139.

As stated, the valve 121 functions as a start and stop valve, while the valve 135 functions as a rate change valve. The strength of the spring 123 controlling the valve 121 is such that the valve normally maintains a low pressure in the passage 54, which is insufficient to open the intake check valve 64 of the variable displacement pump 14 and impart a return stroke to the pistons 62 thereof. Thus, when the valve 121 is controlled by the spring 123 only, no discharge from the structure takes place for the valve 121 is opened by the pressure of the fluid in the passage 54, thereby permitting escape of the fluid through the groove 117, passage 118, groove 116, and out through the return port 120. Spring 136 of valve 135 maintains a pressure in the passage 54, which may approximate 75 pounds, but in all events is sufficient to open the intake check valve 64 and impart a return stroke to the piston 62 of the variable displacement pump 14. When controlled by the spring only, valve 135 functions as a charging valve. Either or both of the valves 121 and 135 may be positively held in closed position by blocking the escape of the hydraulic fluid bleeding into the valves through the apertures 128 and 140 respectively. When valve 121 is positively held closed, discharge takes place with the volume determined by the valve 135. If valve 135 is closed only by spring 136, the volume of discharge is low as determined by the displacement of pump 14, and if valve 135 is positively closed, the volume is large as determined by the displacement of pump 13.

At its right end, the bore 115 is closed by a cap 145 having a third external control fluid port 3 opening therethrough and threaded for the connection of a conduit. An annular groove 146 opens to the bore 115 and communicates with a passage 147 which, as best seen in Figs. 3 and 9, terminates in an external port 4 threaded for the reception of an external conduit #4 leading to the port 99 of the means for varying the displacement of pump 14. The vertical portion of the passage 147 (Fig. 2) may be formed by drilling through the base of the section 19 with the drill hole threaded at 148 and normally blocked by a plug 148'. Similarly, a passage 149 providing communication between the bore 115 and the passage 51 may be formed by drilling through the base of the section 19 and the drill hole again blocked by a plug 150. In the diagrammatic Fig. 9, passage 149 is shown connected to passage 119 instead of passage 51 but for the purpose of passage 149 herein the connections are equivalent. Also opening to the bore 115 is a passage leading to the annular discharge passage 76. This passage is suitably formed in the section 19 and is here represented at 152 (see Figs. 2, 3 and 9). A passage 152' provides communication between groove 126 and passage 76 for the discharge of slippage fluid.

Reciprocable in the right end of the bore 115 is a valve 154 in the form of a hollow piston controlling the supply of fluid to the means for varying the displacement of the variable delivery pump 14. The valve is yieldably urged to the right to the position shown in Fig. 2 by a compression spring 155 interposed between the valve 154 and the plug 124. The valve is formed intermediate its ends with an annular groove 156 and with apertures 157. These are so located that with the valve in the position shown, the passage 152 is closed but the ports 157 register with the grooves 146 to permit the discharge to the passage 51, which is the equivalent of returning it to the reservoir, of any fluid returned through the passage 147. However, when fluid pressure is applied to the right end of the valve through the port 3, the valve is shifted to the left and the groove 156 serves to connect the passage 152 with the groove 146, thereby supplying high pressure fluid to change the displacement of the pump 14.

To accommodate the valve means controlling the direction of fluid discharge from the unitary structure, the section 19 is formed near the top with a transversely extending bore 160, closed at one end by a cap 161 threaded into the section and at the other end by a cap 162 also threaded into the section and which has formed therein a fifth external control fluid port 5 threaded for the reception of a conduit. Substantially midway between the ends of the bore 160, the section 19 is formed with five annular and axially spaced grooves 163, 164, 165, 166, and 167 opening to the bore 160. The intermediate one of these grooves 165, as best seen in Fig. 1, communicates by means of a large passage 168 with the annular passage 76. The grooves 164 and 166 on opposite sides of the groove 165 communicate respective with large external ports 169 and 170 threaded for the reception of conduits leading to the hydraulic motor to be supplied with fluid. End groove 163 is connected by passage 171, 171' (see Figs. 1 and 9) and passage 172 to end groove 167 and to the valve means controlling the return fluid, as will presently be described. In addition, the bore 160 is formed at its left end with an annular groove 174 which is connected by means of a duct 175 (see Figs. 3 and 5) to the port 139 opening to the bore 115, and with an external port 2' (Figs. 3, 5 and 9) threaded for the reception of a conduit. Near its right end, the bore is formed with an annular groove 176 connected by a duct 177 (Figs. 3, 5 and 9) to a duct 173 communicating at one end with the passages 54 and 55 and terminating at the other end in an external threaded port 6. The passage 177 may be drilled with the end of the drill hole closed by a plug 177' (see Fig. 5).

Reciprocable in the bore 160 to control the various grooves, is a spool valve 178 provided with five lands 179, all spaced axially substantially the same distance. At its left end, as viewed in Fig. 2, the valve is formed with a recess 180 for the reception of one end of a compression spring 181, the other end of which abuts the cap 161, and functions to urge the valve toward the right as viewed in Fig. 2 to the forward position of the valve. It will be seen that in this position, grooves 164 and 165 are bridged so that the discharge from the variable delivery pump 14 is directed to the port 169, while grooves 166 and 167 are bridged so that the return fluid entering through part 170 may be directed to the return fluid controlling valve means through passage 172. In this same position, the valve 178 effects communication between groove 174 and the external port 2'. When shifted to the left, as viewed in Fig. 1, to its return position by the application of fluid pressure through the port 5, groove 165 is then connected to groove 166 while groove 164 is connected to groove 163 to reverse the direction of discharge and return of fluid from and to the section. In its return position, the valve blocks the annular groove 174 to disrupt communication between the groove and external port 2'. The valve has an internal passage 182 extending axially thereof and opening at one end to the recess 180 and at the other end communicating with a leakage groove 183 formed in the end land of the valve.

To accommodate the remaining valve means, the section 19 is formed with a transversely extending bore 187 disposed intermediate the bore 160 and shaft 36. The bore 187 has opening thereinto an annular groove 188 which communicates by means of a passage 189 with the left end of the bore 160 and by means of a passage 190 with the passage 119 and the return port 120 to relieve the left end of bore 160 of any fluid that might accumulate therein. To the right of the groove 188 is a groove 192 into which opens passage 172 communicating with the end grooves 163 and 167 of the reversing valve means. An annular groove 194 to the right of the groove 192 communicates by means of a passage 195 with the passage 119 and discharge port 120, and an annular groove 196 at the extreme right end of the bore communicates by means of a passage 197 with the passage 51. For convenience, Fig. 9 shows passage 197 discharging to passage 119 which is the equivalent of discharging to passage 151. Also opening to the bore 187 is a port 198 communicating by means of a suitably positioned passage, here represented at 199, with the supply passage 168 of the variable delivery pump 14.

Interposed between the grooves 192 and 194 and suitably ported to permit communication between the grooves and the bore 187 is a centrally apertured member 200 forming a seat for a valve 201 controlling the return fluid. The valve 201 is slidably supported in a tubular member 202 received in the left end of the bore 187 and retained therein by means of a hollow cap 203 threaded into the end of the bore. Urging the valve 201 to seated position is a compression spring 204 which at one end bears against a flanged washer on the stem of the valve 201 and at the other end bears against a washer 205 swiveled on the end of an adjusting screw 206. The screw 206 is protected by an acorn nut 207 and the tubular member 202 is provided with suitable apertures so as to permit the escape of any fluid within the member 202 through the passage 190 to the discharge port 120.

It will be apparent that the valve 201 is not responsive to the pressure of the return fluid in the passage 172, and to actuate the valve 201, means is provided which is responsive to the supply fluid pressure only. Accordingly, there is received in the right end of the bore 187 a tubular member 210 retained in the bore by means of a hollow cap 211 threaded into the bore. The member 210 is suitably apertured to provide communication between the passage 197 and the interior of the member and is apertured at 212 to provide communication between the interior of the member and the port 198 communicating with the fluid supply passage 168. Interposed between the member 210 and the member 200 is a piston 214 having a point 214' engaging a conical recess in the end of the valve 201 for the purpose of shifting the valve upon actuation of the piston 214.

To subject the piston 214 to the supply pressure, but to prevent shifting thereof due to slight changes in pressure, the closed end of the member 210 has a plug 215 threaded therein which is formed with a small bleed opening 216. Preferably, a screen is positioned over the bleed opening to prevent foreign material from entering and clogging the same. It will be seen that the valve 201 and piston 214 being responsive only to the supply pressure function as a circuit locking means and as a low pressure limit means. To the right of the apertures 212, as viewed in Fig. 2, the member 210 is formed to provide a seat for a disk valve 217 which serves as a relief valve. The valve is urged to seated position by means of a heavy compression spring 218 which abuts against a washer 219 resting on an adjusting screw 220 threaded into the cap 211. This valve is adjusted to open only at extremely high pressures for the purpose of avoiding injury to the system. The adjusting screw 220 is protected by an acorn nut 221. Any leakage fluid that may accumulate in the bore 60 can discharge to the return port 120 through opening 47' and groove 47 of sleeve 46. Similarly, leakage fluid accumulating at the bearing 37 is discharged through duct 222 to return port 120. 223 is a gauge port.

In Figs. 8 and 9, the unitary structure is shown connected to form part of a novel hydraulic circuit, with the confines of the unitary structure represented by a dot-dash line in Fig. 9. Herein the hydraulic circuit is that of a machine tool and comprises in addition to the unitary structure a hydraulic motor generally designated 230, the pilot valve 15 and the solenoid valve 16. The motor 230 comprises a cylinder 231 and a piston 232 reciprocable therein and connected by a rod 233 to a table or slide (not shown) of the machine tool. Herein the table is to be driven through a cycle including rapid approach, fast feed, slow feed, rapid return, and stop. To effect such a cycle of operation, the pilot valve 15 has five positions to which it may be shifted manually by manipulation of a level 235 or to which it may be shifted automatically by means of dogs 237 (Fig. 9) moved in timed relation with the reciprocation of the table and suitably positioned and shaped in well known manner to actuate the pilot valve by engagement with a follower 236. Initiation of the cycle of operation and return movement of the table during feed movement may also be effected by energization of the solenoid valve 16.

Pilot valve 15 is composed of an elongated casing 242 having a bore 243 therein and a valve core 244 slidable in the bore to any one of five positions corresponding to the steps in the cycle, through which the table of the machine tool is to be driven, namely, rapid approach, fast feed, slow feed, rapid return, and stop. The casing 242 has intermediate its ends a wide annular groove 246, and to the right of the groove 246 are three annular grooves 247, 248, and 249, all opening to the bore 243. To the left of the wide groove 246, are two grooves 250 and 251, and a port 252. Controlling these grooves and the port is the valve member 244 which is formed with a wide land 253, a land 254 and a land 255 to the right of the land 253, and a single land 256 to the left of the land 253. The left end of the valve member 244 has an axial passage 257 opening through the end of the valve and opening to a recess 258, in the land 253, which is always in communication with the groove 246. The right end of the valve 244 likewise has an axial passage 259 which communicates with the recess 258 at one end and at the other end opens through ports 260 to the annular space between the lands 254 and 255.

The grooves and the port in the valve casing are so spaced and the lands on the valve member 5 are so spaced and proportioned that in the stop position of the valve, which is the position shown in Fig. 9, port 252 and grooves 251, 247 and 249 are effectively blocked by the valve core 244, while grooves 250 and 248 are in communication with the groove 246 respectively through recess 258 and passage 259. In rapid approach position, port 252 and grooves 251, 247 and 249 are still blocked, and in addition grooves 250 and 248 are blocked. In fast feed position, grooves 250 and 248 are blocked, while the port 252 and the groove 251 are bridged so as to communicate with one another. The grooves 247 and 249 open to the large groove 246, groove 249 communicating with groove 246 through port 260 and the passage 259. In slow feed position, groove 250 is still blocked, while the port 252 and the groove 251 are still bridged to intercommunicate and grooves 247 and 248 are now also bridged to intercommunicate one with the other. Groove 249 still communicates with the groove 246 through the port 260 and passage 259. In return position, grooves 251 and 250 are bridged to intercommunicate, while the port 252 and grooves 247 and 248 are effectively blocked. Groove 249 is still open to the groove 246 through the port 260 and the passage 259.

The solenoid valve 16 comprises a casing 262 having a bore 263 therein in which is shiftable a valve core 264. The valve casing has formed therein intermediate its ends an annular groove 265, and below the groove a port 266 and above the groove a port 267 and a port 268. The lower end of the casing has a discharge port 269. The valve core 264 has an intermediate land and two end lands with an axial passage opening through the lower end of the valve core and terminating at the upper end in radial ports opening through the upper land to a groove which interrupts leakage fluid. The valve core 264 has but two positions, namely, a normal position shown in Fig. 9 to which it is urged by a compression spring 272 and a shifted position to which it is moved by energization of a coil 270, in which position port 266 and groove 265 are bridged and communication between ports 267 and 268 is disrupted. The coil 270 is controlled by one or more push buttons conveniently located about the machine.

The pilot valve and the solenoid valve, constituting the remote control means, are connected to control the governing means housed in the unitary structure, to obtain the desired cycle of operation, by a plurality of external conduits. To that end, external port 1 is connected by a conduit #1 to the port 268 of the solenoid valve 16 and the port 267 of that valve is connected by a continuation conduit #1' to the annular groove 248 of the pilot valve. It will be apparent that both the solenoid valve 16 and the pilot valve 15 control the conduits #1 and #1' and thereby control the start and stop valve 121. To control the charging or rate change valve 135, which is conected by internal passage 175 to the groove 174 of the reversing valve, external port 2' of the reversing valve is connected by a conduit #2 to the groove 249 of the pilot valve. Thus it will be seen that the conduit #2 is controlled by both the reversing valve and the pilot valve thereby jointly controlling the valve 135.

With the present control circuit, external port 2 in the cap 137 is not employed and is closed by a plug. To control valve 154 which governs the displacement varying means of pump 14, external port 3 is connected by a conduit #3 to groove 247 of the pilot valve. External port 5 of the reversing valve is connected by a conduit #5 to the groove 250 of the pilot valve and by a branch conduit #5′ to the groove 265 of the solenoid valve. The remaining external port 6 of the unitary structure which supplies the control fluid is connected by a conduit #6 to the groove 251 of the pilot valve. The control circuit is completed by a conduit #7 connecting port 252 of the pilot valve and port 266 of the solenoid valve and a conduit #8 and a conduit #9 leading respectively from the groove 246 of the pilot valve and the port 269 of the solenoid valve to a reservoir 238. From the foregoing, it will be seen that the remote control means are readily and easily connected to the external ports of the unitary structure and that this is done by a relatively few number of conduits, all of which with the exception of conduit #4 contain only low pressure. While the conduit #4 contains high pressure, it is not readily subject to leakage because it forms a more or less permanent part of the unitary structure and thus rupture of the conduit or the conections may readily be guarded against. Moreover, with the construction disclosed, the remote means is readily changeable to adapt the hydraulic mechanism for cycles of different types.

To complete the hydraulic circuit, the intake port 52 of the unitary structure is connected by means of an intake pipe 275 having a filter 275′ interposed therein, with the tank or reservoir 238 containing a supply of the operating fluid which usually is oil. Return port 120 also is connected with the reservoir 238 through a pipe 239. The port 169 is connected by a conduit 240 to the head end of the cylinder 231 while the port 170 is connected by a conduit 241 to the rod end of the cylinder 231.

The flow of fluid through the circuit and the operation of the various valves may best be understood from a brief description of the operation of the hydraulic circuit. For that purpose, let it be assumed that the solenoid valve is deenergized, and thus in the position shown in Fig. 9, and that the pilot valve is in stop position which is shown in Fig. 9 and that the main governing valves are all in the positions shown in Fig. 9, which are the normal positions. It will be seen that in this position of the solenoid and pilot valves, that conduit #1 is connected through the ports 268 and 267 of the solenoid valve, conduit #1′, groove 248, port 260, passage 259, and groove 246 of the pilot valve and conduit #8 to the reservoir 238. Thus the valve 171 is urged to closed position only by the spring 123 and thus maintains only a low pressure in the passage 54 insufficient to open the intake valves 64 of the variable delivery pump 14 to impart a return stroke to the pistons 62 thereof. Under that condition, the pumps 13 and 14 though running are incapable of supplying any fluid to the motor 230. The pump 13 draws fluid from the reservoir 238 through the intake pipe 275 and discharges the same through port 53 to the passage 54. From the passage 54, the fluid flows to the groove 117, passage 118, groove 116, passage 119 and return pipe 239 to the reservoir.

The circuit may be conditioned to drive the table of the machine tool at a rapid approach rate either by manually shifting the pilot valve to rapid approach position or by energizing the solenoid valve. If the pilot valve is manually shifted to rapid approach position, land 254 of that valve closes groove 248 thereby blocking the escape of fluid through the conduits #1 and #1′. As a result pressure builds up within the valve 121 and maintains the same positively closed, thereby preventing the escape of fluid from the passage 54 to the groove 117. Likewise, conduit #2 is closed by the land 255 of the pilot valve, thereby causing fluid to build up within the valve 135 and causing that valve also to be positively closed, thereby preventing the escape of fluid from the passage 54 to the groove 116. As a result all of the fluid discharged by the constant displacement pump 13 is forced from the passage 54 through the variable delivery pump and the passage 168 to the groove 165 of the reversing valve. With this valve in the position shown in Figs. 2 and 9, the fluid is directed through the port 169 and thence through conduit 240 to the head end of cylinder 231 imparting an approach movement to the table connected to the piston 232. It will be seen that under these conditions, the entire output of the constant displacement pump is supplied to the motor and thus serves to drive the same at a traverse rate.

Conduit #2 is blocked by the pilot valve even in stop position and thus operation at a rapid approach rate may be initiated by closing the conduit #1 by means of the solenoid valve 16. By energizing the solenoid valve, the valve core 264 is shifted upwardly, as a result of which conduit #1 is effectively blocked with the result that pressure builds up within the valve 121 and the operation which has just been described results. When the solenoid valve is employed to initiate operation, a special dog 237a is provided which serves upon initiation of movement of the table to shift the pilot valve from stop to rapid approach position. The solenoid valve is maintained energized until this occurs.

Upon continued movement of the table in a forward direction, a suitably shaped and positioned dog 237b at a predetermined point in the cycle engages the follower 236 to shift the pilot valve from rapid approach to fast feed position. In this position, conduits #1 and #1′ are still blocked by the land 254 of the pilot valve. Conduit #2, however, is now free to discharge through the groove 249, port 260, passage 259, and conduit #8 to the tank, thereby relieving the pressure built up in the valve 135 and causing the same to be urged toward closed position only by the spring 136. As previously stated, this spring is adjusted to maintain a pressure in the passage 54 which is sufficient to open the intake valves 64 of the pump 14 and to impart a return stroke to the pistons 62 thereof but is not sufficient to open the discharge check valves 65 against the pressure in the passage 168. As a result, the variable delivery pump now meters the quantity of fluid which is supplied to the motor 230 and thus accurately determines the feed rate of movement of the table. Any fluid supplied by the constant displacement pump 13 in excess of that metered by the variable delivery pump 14 is discharged through the groove 116, passage 119 and return pipe 239 to the reservoir 238. It is to be noted that in the fast feed position of the pilot valve, conduit #3 is open to the tank 238 thereby permitting spring 155 to shift valve 154 to the right as seen in Figs. 2 and 9. As a result, the conduit #4 which leads from the cylinder 89 of the displacement varying means of the variable delivery pump is open to the reservoir 238 through the passage 147, groove 146, apertures 157 in the valve 155, passage 149 and pipe 239. There is thus no pressure on the piston 88 with the result that the wobble plate 80 assumes the position of maximum displacement for which the pump 14 has previously been adjusted manually.

After a fast feed movement of predetermined length, a suitable dog 237c moved in timed relation with the table engages the follower 236 to shift the pilot valve to its slow feed position. In this position, the conditions remain the same with the exception that grooves 247 and 248 of the pilot valve are now bridged thereby connecting conduits #3 and #1', with the result that the valve 154 is shifted to the left, in which position the groove 156 thereof bridges passage 152 and groove 146 which, as previously stated, communicates with the conduit #4. With the passage 152 connected to the conduit #4, high pressure fluid from the supply passage 168 is now discharged to the cylinder 89 thereby shifting the wobble plate 80 inwardly to the extent determined by the previous setting of the ring 93. The pump 14 now has a smaller displacement with the result that the table is driven at a slower rate of feed movement.

Upon completion of the slow feed movement, a suitable dog 237d engages follower 236 to shift the pilot valve to return position. In that position, the grooves 250 and 251 are bridged with the result that the fluid in conduit #6 is discharged through conduit #5 to the right end of the bore 160 thereby forcing the valve 178 to the left in opposition to the spring 181. Any fluid in the left end of bore 160 is forced out through the passage 189 and connecting passages to the reservoir. Groove 165 is now connected to groove 166 while groove 164 is connected to groove 163 with the result that pressure fluid is now supplied through the port 170 and conduit 241 to the rod end of the cylinder 231 to effect a return movement of the table. Shift of the reversing valve 178 to its return position not only changes the direction of flow of the pressure fluid but also blocks passage 175 and thus causes pressure to build up within the valve 135. Conduits #1 and #1' are still effectively blocked with the result that the entire discharge of the large output pump 13 is again supplied to the motor and thereby effects a traverse movement in a return direction. At the end of the return movement of the table, a suitable dog 237e engages the follower 236 to return the pilot valve to stop position, thereby bringing the table to rest though the pumps continue to operate as previously described.

Should it become desirable at any point in the cycle to effect a return movement of the table, this, of course, may be effected by a manual shift of the pilot valve to return position. Moreover, such return movement may also be effected at any time during feed movement without a shift of the pilot valve and from a remote point by energization of the solenoid valve. With the pilot valve in fast feed or slow feed position, the conduit #1 is effectively blocked to maintain the valve 121 positively in closed position, while groove 251 and port 252 are bridged to connect conduit #6 and conduit #7. Energization of the solenoid valve will then bridge port 266 and groove 265, thereby connecting conduit #7 and conduit #5' to effect a shift of the reversing valve 178 to its return position. In that position, as previously stated, passage 175 is blocked thereby causing valve 135 to be positively held in closed position by the fluid pressure built up therein. A return movement of the table at a traverse rate thus results.

Fluid from the rod end of the cylinder 231 is returned through port 170 and grooves 166 and 167 to passage 172, and fluid from the head end is returned through port 169, grooves 164 and 163 and passages 171 and 171' to the passage 172. From passage 172 the return fluid is returned to the reservoir by means of the passage 119, return port 120, and return pipe 239 under the control of the valve 201. This valve, as previously stated, is not subject to the pressure of the return fluid but is controlled entirely by the pressure of the supply fluid and is provided for the purpose of preventing overrunning of the table during a climb cut or when the tool breaks through the work piece. Accordingly, the return fluid from the groove 163 or the groove 167, depending upon the position of the reversing valve 178 flows through passage 172, the aperture in the member 200 which is controlled by the valve 201 and passage 195 to the passage 119. The valve 201 is controlled by the piston 214 which is subjected to supply pressure through the metering plug in the head end of the member 210, apertures 212 and passage 199. Preferably, the spring 204 urging the valve 201 to seated position is so adjusted with respect to the no load resistance of the table that the pressure of the supply fluid is ample under those circumstances to shift the valve 201 to wide open position. Thus, during both rapid approach and rapid return movement, the valve 201 is shifted to open position permitting substantially unrestricted return flow from the motor to the reservoir. However, during a climb cut of a tool when the cut of the tool tends to move the support more rapidly than it is moved by the fluid supplied by the pump 14, the pressure in the supply passage drops with the result that the valve 201 is shifted to close or at least to restrict passage of return fluid, thereby compelling the table to move only at a rate determined by the quantity of fluid supplied by the pump 14. Should the table become blocked for some reason, pressure in passage 199 would build up until a predetermined limit was reached, at which point relief valve 217 would open permitting discharge to the reservoir.

While the unitary structure is here shown connected in a hydraulic circuit for a machine tool, it is apparent that it is not limited to that use. Moreover, while the remote control means here disclosed is of a nature designed to produce a cycle of movement including rapid approach, fast feed, slow feed, rapid return and stop, this cycle may readily be varied by a change in the remote control means without change in the governing means and the pumping means. The unitary structure which I have provided is thus easily incorporated in any hydraulic circuit and readily connected to remote control means for obtaining various cycles of operation. With my unitary structure, all of the high pressure connections between the pumping mechanism and the governing mechanism are formed in the structure proper thereby reducing the possibility of rupture and leakage and rendering any leakage that does occur less detrimental. Only low pressure conduits connect the remote control means with the unitary structure, and these conduits are always connected to a minimum number of conveniently located external ports on the unitary structure.

which ports are standardized as to function so that the conduits from the remote control means may readily be connected to the proper port.

I claim as my invention:

1. A pump comprising, in combination, a casing having an intake passage therein, a self-priming constant displacement stage housed in one end of the casing and operable upon actuation to draw liquid from a reservoir and discharge the same into the intake passage, a drive shaft for actuating said constant stage, a variable displacement stage housed in said casing comprising a plurality of piston and cylinder means, an intake duct for each of said cylinders communicating with the intake passage, an intake check valve controlling each of said ducts, an exhaust passage, an exhaust duct for each of said cylinders communicating with the exhaust passage, an exhaust check valve controlling each of said exhaust ducts, and means driven by said shaft operable to impart an exhaust stroke only to the pistons, the liquid in the intake passage being relied upon to impart the intake stroke to the pistons, and a dumping valve communicating with the intake passage and providing an outlet for the return of liquid from the passage to the reservoir, said valve having a first adjustment permitting opening thereof and flow of liquid from the passage to the reservoir at a pressure below that required to impart an intake stroke to the pistons, a second adjustment maintaining a pressure in the intake passage sufficient to impart an intake stroke to the pistons but below the pressure required to open said exhaust valves, and a third adjustment in which said valve is maintained positively closed forcing all liquid displaced by the constant stage through the variable stage and means for effecting such adjustments of said valve.

2. A pump comprising, in combination, a casing having an intake passage therein, a constant displacement stage housed in one end of the casing and operable upon actuation to draw fluid from a source and discharge the same into the intake passage, a drive shaft for actuating said constant stage, a dumping valve communicating with the intake passage providing a port for the return of liquid in the passage to the source, said valve being adjustable to permit flow from the intake passage to the source at a predetermined low pressure, or to permit flow at a predetermined higher pressure, or to be closed positively to prevent any flow whatsoever, a variable displacement stage housed in said casing comprising a plurality of piston and cylinder means, an intake duct for each of said cylinders communicating with the intake passage, an intake check valve controlling each of said ducts, an exhaust passage, an exhaust duct for each of said cylinders communicating with the exhaust passage, an exhaust check valve controlling each of said exhaust ducts, and means driven by said shaft operable to impart an exhaust stroke only to the pistons, the fluid in the intake passage being relied upon to impart the intake stroke to the pistons whereby, depending upon the pressure maintained by said dumping valve, the variable displacement stage with continued actuation of the piston actuating means is inoperable to pump any fluid or is operable to pump a predetermined quantity of fluid, or provides a passage for the discharge of all fluid displaced by the constant displacement stage regardless of the displacement for which the variable stage is adjusted and means for effecting such adjustments of said valve.

3. A pump comprising, in combination, a casing having a passage therein, a constant displacement stage housed in the casing and operable upon actuation to draw liquid from a reservoir and discharge the same into the passage, a dumping valve communicating with the passage and providing an outlet for the return of liquid to the reservoir, said valve being adjustable to permit flow of liquid therethrough at a predetermined low pressure, or at a predetermined higher pressure, or to be positively closed and totally prevent flow of liquid therethrough and having its outlet side free from the pressure influence of the first stage, and a non-self-priming variable displacement stage housed in the casing supplied with liquid from the passage in the casing and operable when said dumping valve is closed to permit the passage therethrough of the entire quantity of liquid discharged by the constant displacement stage and operable when said dumping valve maintains the higher predetermined pressure to meter and discharge from the pump a quantity of the liquid supplied by the constant displacement stage as determined by the displacement for which the variable stage is set, and ineffective at the lower pressure maintained by said dumping valve to discharge liquid from the pump and means for effecting such adjustments of said valve.

4. In a pump, an elongated casing having an axial bore and an annular series of cylinders extending longitudinally of the casing, a piston reciprocable in each of said cylinders, liquid supply and discharge passages in the casing leading to and from the cylinders, a shaft journaled in the casing concentrically of the annular series of pistons terminating at one end in the bore and at the other end extending outwardly of the casing, said shaft at its inner end being formed with a recess oblique to the axis of the shaft and opening through the end thereof, a wobble plate for reciprocating said pistons having a longitudinally extending arm projecting into the recess in said shaft for actuation of the plate, a journal for said plate, and means for shifting said plate axially relative to said shaft to vary the stroke of the pistons.

5. In a pump, an elongated casing having an annular series of cylinders extending longitudinally of the casing, a piston reciprocable in each of said cylinders, fluid supply and discharge passages in the casing leading to and from the cylinders, a shaft journaled in the casing concentrically of the annular series of pistons and extending outwardly of the casing, said shaft at its inner end being formed with a recess oblique to the axis of the shaft constituting a crank arm, a wobble plate for reciprocating said pistons having a longitudinally extending arm projecting into the recess in said shaft for actuation of the plate, and a journal for said plate, said shaft and said plate being relatively adjustable axially to vary the stroke of the pistons.

6. In a variable displacement pump, an elongated casing having a plurality of annularly arranged cylinders extending longitudinally thereof, fluid supply and discharge passages in the casing leading to and from the cylinders, a piston reciprocable in each of said cylinders, a wobble plate for actuating said pistons having an arm extending longitudinally of the casing, a shaft disposed longitudinally of the casing, and a driving connection between said shaft and said wobble plate adjustable by relative axial movement of said shaft and said plate to vary the throw imparted to said plate by rotation of the shaft.

7. In a variable displacement pump, an elongated casing having a plurality of annularly arranged cylinders extending longitudinally thereof, liquid supply and discharge passages in the casing leading to and from the cylinders, a piston reciprocable in each of said cylinders, a wobble plate for actuating said pistons having an arm extending longitudinally of the casing, a shaft for actuating said wobble plate having a driving connection therewith operable upon relative axial movement of said plate and said shaft to vary the throw imparted to said plate by rotation of the shaft, and a journal on which said wobble plate is swivelled movable longitudinally of the casing to vary the displacement of the pump and change the mean position of said pistons by longitudinal movement of said plate.

8. In a variable displacement pump, an elongated casing having a plurality of annularly arranged cylinders extending longitudinally thereof, fluid supply and discharge passages in the casing leading to and from the cylinders, a piston reciprocable in each of said cylinders, a wobble plate for imparting an exhaust stroke to said pistons, a rotatable shaft for actuating said wobble plate, means varying the throw imparted to said wobble plate by said shaft to vary the displacement of the pump, and means shifting said wobble plate longitudinally of the casing to shift the mean position of said pistons.

9. In a variable displacement pump, a casing having a plurality of cylinders therein, fluid supply and discharge passages in the casing leading to and from the cylinders, a piston reciprocable in each of said cylinders, means for reciprocating said pistons in constant engagement therewith during the pumping operation of the pump, and means varying the stroke of said pistons to vary the displacement of the pump and to reduce the head clearance in the cylinders upon a decrease in displacement of the pump.

10. In a variable displacement pump, a casing having a plurality of cylinders formed therein, liquid supply and discharge passages in the casing leading to and from the cylinders, a piston reciprocable in each of said cylinders, means for reciprocating said pistons in constant engagement therewith during the pumping operation of the pump, and means for varying the displacement of the pump and for maintaining a small head clearance in the cylinders with a decrease in displacement, changing the stroke of the pistons and the mean position thereof.

11. In a pump, the combination of means supplying fluid operable to maintain selectively a first predetermined pressure or a second substantially higher pressure, and variable output pumping means supplied with fluid by said first mentioned means, said pumping means when supplied with fluid at the first pressure metering the quantity of fluid discharged from the pump and when supplied with fluid at the second pressure providing an open passage free from control of the pumping means for the flow therethrough of the fluid supplied by said first mentioned means.

12. In a variable displacement pump, an elongated casing having a plurality of annularly arranged cylinders extending longitudinally thereof, fluid supply and discharge passages in the casing leading to and from the cylinders, a piston reciprocable in each of said cylinders, a wobble plate for actuating said pistons having an arm extending longitudinally of the casing, a shaft disposed longitudinally of the casing having a driving connection for actuating said plate operable upon relative axial movement of said shaft and said plate to vary the throw imparted to the plate by rotation of the shaft, an axially movable journal upon which said plate is swivelled, and means external of the casing operable to adjust the position of said plate relative to said shaft to vary the displacement of the pump.

13. In a variable displacement pump, an elongated casing having a plurality of annularly arranged cylinders extending longitudinally thereof, liquid supply and discharge passages in the casing leading to and from the cylinders, a piston reciprocable in each of said cylinders, a wobble plate for actuating said pistons having an arm extending longitudinally of the casing, a shaft disposed longitudinally of the casing having a driving connection for actuating said plate operable upon relative axial movement of said shaft and said plate to vary the throw imparted to the plate by rotation of the shaft, a piston slidable longitudinally of the casing and providing a journal upon which said wobble plate is swivelled, a rod extending transversely of said piston and outwardly of the casing, and rotatable cam means engaging the projecting ends of said rod to fix the axial position of said wobble plate.

14. In a variable displacement pump, an elongated casing having a plurality of annularly arranged cylinders extending longitudinally thereof, liquid supply and discharge passages in the casing leading to and from the cylinders, a piston reciprocable in each of said cylinders, a wobble plate for actuating said pistons having an arm extending longitudinally of the casing, a shaft disposed longitudinally of the casing having a driving connection for actuating said plate operable upon relative axial movement of said shaft and said plate to vary the throw imparted to the plate by rotation of the shaft, a member secured to the end of said casing having a longitudinal bore and a cylindrical outer surface, a piston slidable in the bore and providing a journal upon which said wobble plate is swivelled, a pair of rings rotatable upon said cylindrical surface, cam surfaces on the adjacent edges of said rings, diametrically opposite longitudinal slots in said cylindrical surface, and a rod fixed in said piston and extending transversely thereof and through said slots between the cam surfaces on said rings.

15. In a variable displacement pump, an elongated casing having a plurality of annularly arranged cylinders extending longitudinally thereof, liquid supply and discharge passages in the casing leading to and from the cylinders, a piston reciprocable in each of said cylinders, a wobble plate for actuating said pistons having an arm extending longitudinally of the casing, a shaft disposed longitudinally of the casing having a driving connection for actuating said plate operable upon relative axial movement of said shaft and said plate to vary the throw imparted to the plate by rotation of the shaft, a cover member secured over the end of said casing having a longitudinal bore, a piston slidable in the bore and providing a journal upon which said wobble plate is swivelled, adjustable means limiting the movement of said piston in a direction to increase the displacement of the pump, adjustable means limiting the movement of said piston in a direction to decrease the displacement of the pump, and a duct leading to said bore to supply fluid pressure for shifting said piston to decrease the displacement.

16. In combination with a source of liquid under pressure, a variable displacement pump comprising a casing having an intake passage communicating with the source of liquid and a discharge passage, a plurality of cylinders in said casing communicating with each of the passages, a piston reciprocable in each of said cylinders, means imparting an exhaust stroke only to said pistons and limiting the intake stroke thereof at all displacements, a pressure actuated valve controlling the communication between the intake passage and each cylinder opening to permit an influx of the liquid from the passage to the cylinder for imparting an intake stroke to the piston and closing to prevent discharge from the cylinder, and an independent pressure actuated valve controlling communication between the discharge passage and each cylinder opening upon an exhaust stroke of the piston and closing upon an intake stroke to prevent return flow into the cylinder.

17. A pump comprising, in combination, an elongated casing, pumping elements housed in a pump chamber formed in one end of the casing and operable upon actuation to draw liquid into the pump chamber and discharge the same therefrom under pressure to a passage in said casing, a shaft for driving said pumping elements disposed longitudinally of said casing, a plurality of cylinders in the casing, a piston reciprocable in each of said cylinders, cam-like means driven by said shaft disposed to abut the ends of the pistons for imparting a discharge stroke only to said pistons, the intake stroke being imparted to said pistons by the liquid discharged from said pumping elements but limited at all times by said cam-like means, and valves yieldable to pressure controlling the flow of liquid into and the discharge of liquid from the cylinders.

18. A pump comprising, in combination, a casing having a plurality of cylinders annularly arranged and disposed longitudinally of the casing, an intake and a discharge passage in said casing, a first duct for each of said cylinders providing communication between the cylinder and the intake passage, a second duct for each of said cylinders providing communication between the cylinder and the discharge passage, a yieldably closed valve disposed in each of said first ducts opening to permit flow of liquid into the cylinder and self-closing to prevent flow out of the cylinder, a yieldably closed discharge valve in each of said second ducts opening to permit discharge of liquid therethrough and self-closing to prevent return flow into the cylinder, a piston reciprocable in each of said cylinders and in all positions projecting from the end of the cylinder remote from the valves, a wobble plate against which the projecting ends of said pistons abut operable upon actuation to impart an exhaust stroke to said pistons, a shaft having a connection with said wobble plate for actuating the same, and pumping means driven by said shaft discharging liquid under pressure to the intake passage for imparting an intake stroke to said pistons.

19. A pump comprising, in combination, an elongated casing having an annular passage, rotary pumping elements housed in one end of said casing operable upon rotation to draw liquid from a reservoir and discharge the same to the annular passage in said casing, a shaft extending longitudinally of the casing for driving said rotary pumping elements, a plurality of longitudinally disposed annularly arranged cylinders in said casing, a piston reciprocable in each of said cylinders, a duct leading from the annular passage in said casing to each of said cylinders to supply said cylinders with liquid discharged by said rotary pumping elements, a self-closing check valve in each of said ducts permitting flow of liquid into but preventing discharge of liquid from said cylinders, a discharge passage in said casing, a duct leading from each of said cylinders to said discharge passage, a self-closing check valve in each of said last named ducts permitting discharge of liquid through said duct from the cylinder but preventing return flow into the cylinder, and a wobble plate for imparting an exhaust stroke only to said pistons actuated by the shaft driving said rotary pumping elements.

20. In a variable displacement pump, a casing having a plurality of cylinders therein, fluid supply and discharge passages in the casing leading to and from the cylinders, a piston reciprocable in each of said cylinders, a wobble plate for actuating said pistons having an arm extending perpendicular thereto, a shaft for actuating said wobble plate, and a driving connection between said shaft and said wobble plate including means on said shaft and on said arm having an engagement for sliding movement oblique to the axis of said shaft upon relative axial movement of said shaft and said plate to vary the throw imparted to said plate by rotation of the shaft.

21. In a variable displacement pump, a casing having a plurality of cylinders therein, liquid supply and discharge passages in the casing leading to and from the cylinders, a piston reciprocable in each of said cylinders, and means for reciprocating said pistons, said means being adjustable to vary the stroke of said pistons for varying the displacement of the pump and to reduce the head clearance in the cylinders upon a decrease in displacement of the pump.

22. In a variable displacement pump, a casing having a plurality of cylinders therein, liquid supply and discharge passages in the casing leading to and from the cylinders, a piston reciprocable in each of said cylinders, and a single means for reciprocating said pistons, said single means being adjustable to vary the stroke of said pistons to vary the displacement of the pump and in such adjustment varying the mean position of the pistons to maintain a small head clearance in the cylinders even with a reduction in displacement.

23. In combination with a source of liquid under pressure, a variable displacement pump comprising a casing having an intake passage communicating with the source of liquid and a discharge passage, a plurality of cylinders in said casing communicating with each of the passages, a piston reciprocable in each of said cylinders, a wobble plate for actuating said pistons having an abutting engagement only with said pistons, a shaft having a driving connection for actuating said plate operable upon relative axial movement of said shaft and said plate to vary the throw imparted to the plate by rotation of the shaft, said wobble plate being shiftable relative to said casing to vary the mean position of said pistons and to limit the intake stroke of said pistons with a change in displacement, a valve yieldable to pressure controlling the communication between the intake passage and each cylinder opening to permit an influx of a liquid from the passage to the cylinder for imparting an intake stroke to the piston and closing to prevent discharge from the cylinder, and a valve yieldable to pressure controlling communication between the discharge passage and each cylinder opening upon an exhaust stroke of the piston and closing upon intake stroke to prevent return flow into the cylinder.

24. A pump comprising, in combination, a casing having a passage therein, a constant displacement stage housed in the casing and operable upon actuation to draw liquid from a reservoir and discharge the same into the passage, a dumping valve communicating with the passage and providing an outlet for the return of liquid to the reservoir, said valve being adjustable to permit flow of liquid therethrough at a predetermined low pressure, or at a predetermined higher pressure, or to be positively closed and totally prevent flow of liquid therethrough, means for setting said valve to cause it to pass fluid at the predetermined low pressure adjustment, or at the predetermined high pressure adjustment, or to be positively closed, and a non-self-priming variable displacement stage housed in the casing supplied with liquid from the passage in the casing and operable when said dumping valve is closed to permit the passage therethrough of the entire quantity of liquid discharged by the constant displacement stage and operable when said dumping valve maintains the higher predetermined pressure to meter and discharge from the pump a quantity of liquid supplied by the constant displacement stage as determined by the displacement for which the variable stage is set, and ineffective at the lower pressure maintained by said dumping valve to discharge liquid from the pump.

25. A pump comprising, in combination, a casing having a passage therein, a constant displacement stage housed in the casing and operable to receive liquid from a reservoir and discharge the same into the passage, a dumping valve communicating with the passage controlling the return of liquid from the passage to the reservoir, said valve being adjustable to permit discharge to the reservoir at a predetermined low pressure or at a predetermined substantially higher pressure, or to be closed positively and thereby prevent all discharge, means for actuating said valve to cause it to pass fluid at the predetermined low pressure adjustment, or at the predetermined high pressure adjustment, or to be positively closed, and a variable displacement stage supplied with liquid from the passage to which the constant displacement stage discharges, operable to act variously upon the liquid discharged by the constant displacement stage in accordance with the condition imposed by the dumping valve.

26. Fluid displacement means comprising, in combination, a casing having a passage therein, a first stage housed in a casing and operable upon actuation to receive fluid from a source and discharge the same into the passage, a dumping valve communicating with the passage and providing an outlet for the return of fluid to the source, said valve being adjustable to permit flow of fluid therethrough at a predetermined low pressure or at a predetermined higher pressure, or to be positively closed and totally prevent flow of fluid therethrough, means for effecting such adjustments of said valve, and a non-self-priming stage housed in a casing supplied with fluid from said passage and operable when said dumping valve is closed to permit the free unmetered passage therethrough of the entire quantity of fluid discharged by said first stage, and operable when said dumping valve maintains the higher predetermined pressure to meter and discharge a quantity of fluid supplied by said first stage as determined by the displacement of said non-self-priming stage and ineffective at the lower pressure maintained by said dumping valve to discharge fluid from the displacement means.

27. A fluid displacement means comprising, in combination, a casing having a passage therein, a constant displacement stage operable to receive fluid from a source and discharge the same into the passage, a dumping valve communicating with the passage controlling the return of fluid from the passage to the source, said valve being adjustable to permit discharge to the source at a predetermined low pressure or at a predetermined substantially higher pressure, or to be closed positively and thereby prevent all discharge to the source, means for effecting such adjustments of said valve, and a variable displacement stage supplied with fluid from the passage to which the constant displacement stage discharges, said variable displacement stage having inlet and exhaust check valves yieldably urged toward closed position and said variable displacement stage acting upon the liquid discharged by the constant displacement stage in various ways in accordance with the condition imposed by the dumping valve.

28. In a fluid pump, the combination of means supplying fluid operable to maintain selectively a first predetermined pressure or a second substantially higher pressure, and pumping means supplied with fluid by said first mentioned means, said pumping means when supplied with fluid at the first pressure metering the quantity of fluid discharged from the pump, and when supplied with fluid at the second pressure providing an open passage free from control of the pumping means for the flow therethrough of the fluid supplied by said first mentioned means.

29. In a fluid pump, the combination of means supplying fluid operable to maintain selectively, a low pressure, a first predetermined higher pressure, or a second predetermined still higher pressure, and pumping means supplied with fluid by said first mentioned means, said pumping means when the pressure maintained by the first mentioned means is low rejecting all fluid discharged by the first mentioned means, when supplied with fluid at the first predetermined higher pressure metering the quantity of fluid discharged from the pump, and when supplied with fluid at the second predetermined still higher pressure providing an open passage for the unmetered flow therethrough of the entire quantity of fluid supplied by said first mentioned means.

30. In a variable displacement pump, an elongated casing having a plurality of annularly arranged cylinders extending longitudinally thereof, fluid supply and discharge passages in the casing leading to and from the cylinders, a piston reciprocable in each of said cylinders, a wobble plate for actuating said pistons, a shaft disposed longitudinally of the casing having a driving connection with said wobble plate for actuating the same, and means for varying the throw of the wobble plate to vary the displacement of the pump comprising a cylinder, a piston reciprocable in said cylinder and having an operative engagement with said wobble plate to change the throw thereof upon a shift of the piston, and a duct leading to said cylinder to supply fluid pressure for effecting a shift of the piston to vary the displacement of the pump.

31. A pump comprising, in combination, a casing having a passage therein, a first stage housed in the casing and operable to receive fluid from a source and discharge the same into the passage, a dumping valve communicating with the passage controlling the by-passing of fluid, said valve having a first tensioning means to permit by-passing of fluid at a predetermined low pressure, a second tensioning means to permit by-passing of fluid only at a predetermined substantially higher pressure, and means for selectively rendering said tensioning means operative or for positively closing said valve to prevent all by-passing at any pressure, and a second stage supplied with fluid from the passage to which the first stage discharges operable to act upon the fluid discharged by the first stage in various ways in accordance with the condition imposed by the dumping valve.

32. A fluid pressure generating means comprising a variable pressure large output stage, a positive displacement stage and a double by-pass valve connected in circuit with the stages and controlling the rate at which fluid is discharged from the device comprising a casing having a bore therein, two annular valve seats in the bore spaced from the walls of the casing, a supply passage discharging to the bore and a port leading from the bore, two valve members slidable in the bore and adapted to engage the respective seats to control the flow of fluid through the valve, a first spring urging one of said members to seated position yieldable at a low pressure, a second spring urging the other of the members to a seated position yieldable at a higher pressure, and means for maintaining said members positively seated to prevent the by-passing of any fluid through said valve.

33. In a fluid pressure generating device having a variable pressure stage, a by-pass valve controlling the discharge pressure of the stage comprising a valve casing, a bore in the casing, annular means extending inwardly from the casing forming annular axially spaced valve seats, a supply port communicating with the bore to one side of said seats, a discharge port communicating with the interior of the bore to the other side of said seats, a first valve slidable in one end of the bore, a light spring urging the first valve to seated position, a second valve slidable in the other end of the bore, a heavy spring urging said valve to seated position to permit opening thereof only at a substantially higher pressure, a small aperture in each valve leading from the supply port to the chambers formed behind the valves, ducts leading from the chambers behind the valves, and valve means controlling said ducts to cause either or both of said valves to be positively held seated by the fluid in the chambers behind the valves.

34. A fluid pressure generating means comprising a variable pressure large output stage, a positive displacement stage, and a double by-pass valve connected in circuit with the stages and controlling the rate at which fluid is discharged from the device comprising a casing having a bore therein, supply and exhaust ports opening to the bore, two valve members slidable in the bore and each disposed with respect to the supply and exhaust ports to control the flow of fluid through the valve, a first spring urging one of said valve members to closed position, said spring being yieldable at a low pressure, a second spring urging the other of said valve members to closed position, said second spring being yieldable at a higher pressure, and means for positively maintaining either or both of said valve members in closed position.

35. In a fluid pump, the combination of means supplying fluid operable to maintain selectively a first predetermined pressure or a second substantially higher pressure, and pumping means supplied with fluid by said first mentioned means, said pumping means when supplied with fluid at the first pressure rejecting the fluid so supplied and being inoperative to discharge fluid from the pump, and when supplied with fluid at the second pressure serving to meter the quantity of fluid discharged from the pump.

36. A fluid pressure generating device comprising a first means for pumping a large quantity of fluid, a second means for pumping a smaller metered quantity of fluid, and a single control unit governing the rate at which fluid is supplied by said generating device having a first adjustment rendering said first means effective to discharge fluid from said generating device, a second adjustment rendering said second means effective to discharge fluid from said pressure generating device, and a third adjustment rendering both said first and said second means ineffective to discharge fluid from the pressure generating device.

37. A fluid pressure generating device comprising, in combination, a casing having a passage therein, a first stage housed in the casing and operable to receive fluid from a source and discharge the same into the passage, a dumping valve communicating with the passage controlling the by-passing of fluid from the passage, said valve having tensioning means setable at will to permit by-passing of fluid at a predetermined low pressure or at a predetermined substantially higher pressure, and means operable to cause positive closing of said valve to prevent all by-passing at any pressure, and a second stage supplied with fluid from the passage to which the first stage discharges operable to act in various ways upon the fluid discharged by the first stage in accordance with the pressure condition imposed by the dumping valve.

38. In a pump having a constant displacement variable pressure stage, a by-pass valve governing the pressure at which the stage discharges comprising a valve member biased to closed position, said member being exposed to the fluid discharged from said variable pressure stage and urged thereby toward open position, and means including the fluid to which said member is responsive for positively maintaining said member seated regardless of the discharge pressure of said variable pressure stage.

39. In a variable displacement pump, an elongated casing having a plurality of annularly arranged cylinders extending longitudinally thereof, liquid supply and discharge passages in the casing leading to and from the cylinders, a piston reciprocable in each of said cylinders, a wobble plate for actuating said pistons having an arm extending longitudinally of the casing, a shaft disposed longitudinally of the casing having a driving connection for actuating said plate operable upon relative axial movement of said shaft and said plate to vary the throw imparted to the plate by rotation of the shaft, a member secured over the end of said casing having a longitudinal bore and a cylindrical outer surface, a piston slidable in the bore and providing a journal upon which said wobble plate is swiveled, diametrically opposite longitudinal slots in said cylindrical surface, means fixed with said piston projecting transversely thereof and outwardly of said member through said slots therein, and a pair of rings rotatable upon said cylindrical surface disposed on opposite sides of the projecting means providing adjustable limits for the movement of said piston.

40. In a fluid supply system, a pump having a constant displacement variable pressure stage, a by-pass valve means governing the pressure at which the stage discharges comprising a valve member biased to closed position, said member being exposed to the fluid discharged from said variable pressure stage and urged thereby toward open position, a bleed opening in said valve member leading from the front to the rear of said valve member, a discharge conduit leading from the valve means behind said valve member, and means operable positively to close said discharge conduit to trap behind the valve member the fluid bleeding through said bleed opening to equalize the pressure on opposite sides of said valve member and render the same positively closed.

GUNNAR A. WAHLMARK.

DISCLAIMER 2,214,390.—*Gunnar A. Wahlmark*, Rockford, Ill. FLUID PRESSURE GENERATING AND CONTROL MEANS. Patent dated September 10, 1940. Disclaimer filed January 19, 1942, by the inventor.

Hereby enters this disclaimer to claim 16 in said specification.

[*Official Gazette February 10, 1942.*]